(12) United States Patent
Gentner et al.

(10) Patent No.: US 8,966,998 B2
(45) Date of Patent: Mar. 3, 2015

(54) SUPPORT UNIT

(75) Inventors: Wolfgang Gentner, Steinheim (DE); Bert Wegner, Gingen (DE); Joerg Riehle, Asperg (DE)

(73) Assignee: Scambia Holdings Cyprus Limited, Limassol (CY)

( * ) Notice: Subject to any disclaimer, the term of this patent is extended or adjusted under 35 U.S.C. 154(b) by 60 days.

(21) Appl. No.: 13/612,244

(22) Filed: Sep. 12, 2012

(65) Prior Publication Data

US 2013/0091962 A1 Apr. 18, 2013

(30) Foreign Application Priority Data

Sep. 12, 2011 (DE) .......................... 10 2011 053 505

(51) Int. Cl.
| | | |
|---|---|---|
| *G01L 1/10* | (2006.01) | |
| *G01L 1/00* | (2006.01) | |
| *B60D 1/24* | (2006.01) | |
| *B60D 1/62* | (2006.01) | |
| *G01L 1/12* | (2006.01) | |

(52) U.S. Cl.
CPC . *G01L 1/00* (2013.01); *B60D 1/248* (2013.01); *B60D 1/62* (2013.01); *G01L 1/12* (2013.01)
USPC ................................ 73/862.625; 73/862.621

(58) Field of Classification Search
CPC ........................................ G01L 1/14; G01L 1/16
USPC ...................................................... 73/862.625
See application file for complete search history.

(56) References Cited

U.S. PATENT DOCUMENTS

| | | | |
|---|---|---|---|
| 4,319,766 A | 3/1982 | Corteg et al. | |
| 6,755,087 B2 * | 6/2004 | Clegg ....................... | 73/862.621 |
| 7,698,962 B2 * | 4/2010 | LeFebvre et al. ......... | 73/862.621 |
| 2002/0095251 A1 * | 7/2002 | Oh et al. .......................... | 701/70 |
| 2003/0160428 A1 * | 8/2003 | Lindell et al. ................. | 280/432 |
| 2004/0222880 A1 * | 11/2004 | Lee et al. ....................... | 340/431 |
| 2005/0081651 A1 * | 4/2005 | Loher et al. .............. | 73/862.625 |
| 2005/0132820 A1 * | 6/2005 | Eilersen ................... | 73/862.625 |
| 2005/0160837 A1 * | 7/2005 | Tellenbach et al. ...... | 73/862.625 |
| 2005/0229713 A1 * | 10/2005 | Niblock .......................... | 73/760 |
| 2006/0071448 A1 * | 4/2006 | Craig et al. .................... | 280/511 |

(Continued)

FOREIGN PATENT DOCUMENTS

| | | |
|---|---|---|
| AU | 2008264181 A1 | 7/2009 |
| DE | 10154733 A1 | 5/2003 |

(Continued)

*Primary Examiner* — Lisa Caputo
*Assistant Examiner* — Philip Cotey
(74) *Attorney, Agent, or Firm* — Reinhart Boerner Van Deuren P.C.

(57) ABSTRACT

In order to improve a support unit for motor vehicles comprising a supporting structure mounted on a rear end portion of the motor vehicle a sensor unit is provided for detecting forces acting on the supporting structure and elastically deforming the same. The sensor unit is provided with a sensor base, comprising two fixation regions which are spaced apart and can be fixed to mounting regions of an elastically deformable supporting structure portion. A transformation region disposed between the fixation regions mechanically converts the movements of the mounting regions, and thus also of the fixation regions relative to one another. Movements are generated by the elastic deformation of the supporting structure portion, into a movement of measuring points of the transformation region relative to one another. The movement of the measuring points can be detected by the sensor unit.

29 Claims, 15 Drawing Sheets

(56) References Cited

U.S. PATENT DOCUMENTS

| | | |
|---|---|---|
| 2007/0006652 A1* | 1/2007 | Weldon et al. ................. 73/579 |
| 2007/0210538 A1 | 9/2007 | Steprath et al. |
| 2008/0245156 A1* | 10/2008 | Niblock ......................... 73/760 |
| 2009/0005946 A1* | 1/2009 | Futamura et al. ............... 701/70 |
| 2009/0093928 A1* | 4/2009 | Getman et al. ................. 701/37 |
| 2009/0120211 A1* | 5/2009 | Roovers et al. .......... 73/862.474 |
| 2009/0301212 A1* | 12/2009 | Leiderer ...................... 73/729.2 |
| 2010/0076673 A1 | 3/2010 | Saloka |
| 2010/0109286 A1* | 5/2010 | Visser .......................... 280/477 |
| 2010/0114437 A1* | 5/2010 | Boss et al. ...................... 701/48 |
| 2010/0155579 A1* | 6/2010 | Torres-Jara .................. 250/221 |
| 2010/0251831 A1* | 10/2010 | Hose von Wolfframsdorff et al. ....................... 73/862.045 |
| 2011/0126639 A1* | 6/2011 | Behrens ................... 73/862.193 |

FOREIGN PATENT DOCUMENTS

| | | |
|---|---|---|
| DE | 10 2004 031 467 A1 | 1/2006 |
| DE | 10 2006 007 385 A1 | 8/2007 |
| EP | 0 799 732 A1 | 10/1997 |
| EP | 1 142 732 A2 | 10/2001 |
| EP | 1199547 A2 | 4/2002 |

\* cited by examiner

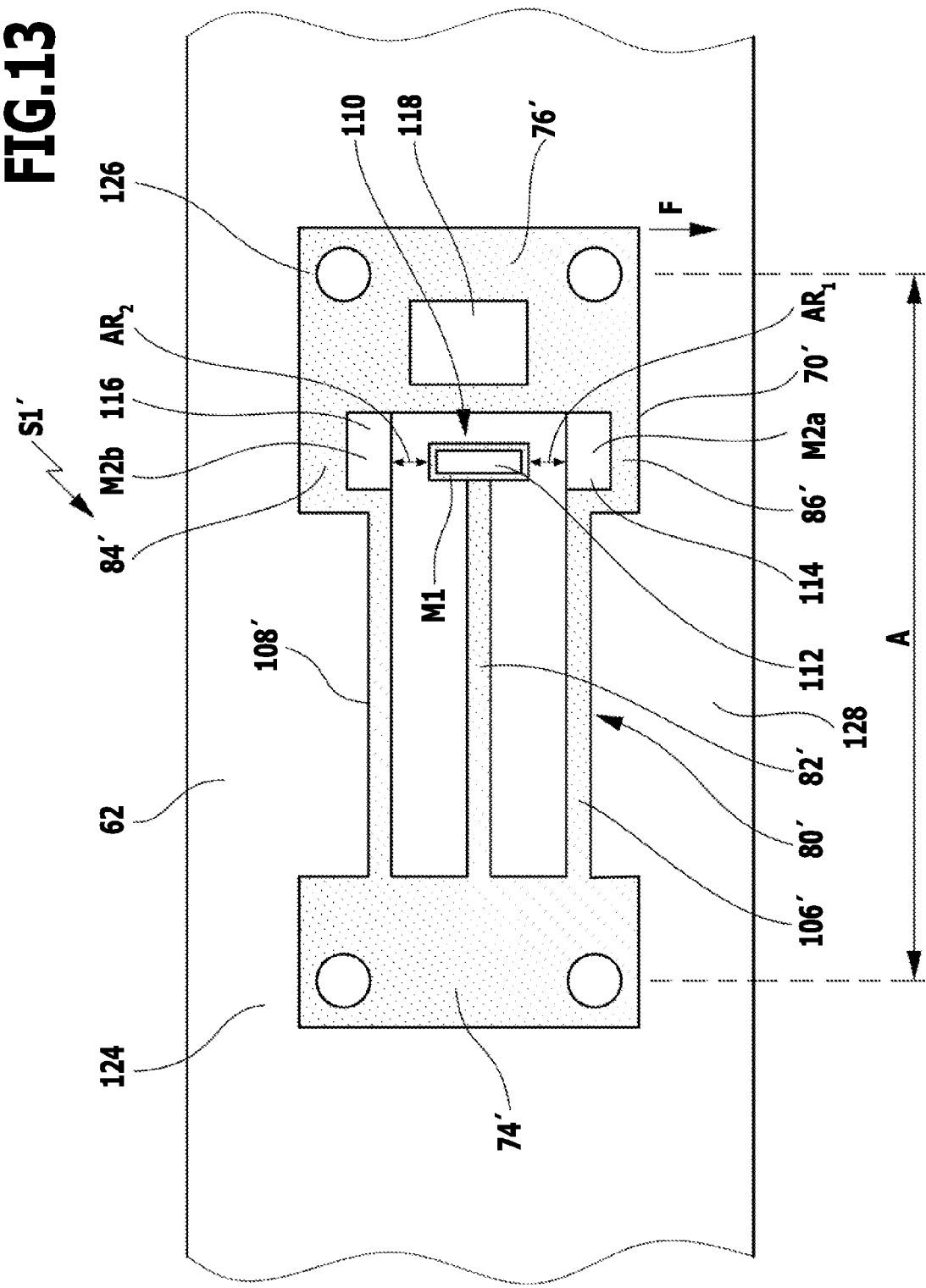

SUPPORT UNIT

CROSS-REFERENCE TO RELATED PATENT APPLICATIONS

This patent application claims the benefit of German application No. 10 2011 053 505.5, filed Sep. 12, 2011, the teachings and disclosure of which are hereby incorporated in their entirety by reference thereto.

BACKGROUND OF THE INVENTION

The invention relates to a support unit for motor vehicles, comprising a supporting structure that can be mounted on the rear end region of the motor vehicle.

The problem of such support units is that the loads acting on these support units should be detected so that it is possible, for example, to indicate to a driver if the loads acting on the supporting structure are too high, negligible, too low, that is, negative, or are still within a tolerable range which influences the handling characteristics of the motor vehicle to a tolerable extent.

SUMMARY OF THE INVENTION

It is therefore an object of the invention to improve a support unit of the kind as described above in such a manner that the loads acting on the supporting structure can be detected.

This object is achieved for a support unit of the above-described kind in that a sensor unit is provided for detecting forces acting on the supporting structure and elastically deforming the same, that the sensor unit is provided with a sensor base, that the sensor base comprises two fixation regions which are spaced apart from one another and can be fixed to mounting regions of an elastically deformable supporting structure portion, and comprises a transformation region disposed between the fixation regions, that the transformation region mechanically converts the movements of the mounting regions and thus also of the fixation regions relative to one another, said movements being generated by the elastic deformation of the supporting structure portion, into a movement of measuring points of the transformation region relative to one another, and that the movement of the measuring points can be detected by the sensor unit.

The advantage of the solution according to the invention is to be seen in the fact that with this solution, a simple possibility has been provided to detect the applied load without requiring a great deal of technological effort.

In particular, the sensor base offers the possibility of converting the movements of the mounting regions of the supporting structure portion into a movement of measuring points, the movement of which can easily be detected by the sensor unit, in particular because the mounting regions and thus also the fixation regions can be arranged by means of the provided sensor base in such a manner that there is a sufficiently large distance between them and therefore a sufficiently large elastic deformation of the transformation region located between said regions and comprising said regions can be detected.

This is an advantage, in contrast to the sensors known heretofore which detect relative movements of regions which are very small and are disposed at a small distance from one another, whereby there results a high susceptibility to measurement errors and consequently, the measuring result is not reliable and reproducible to the extent desired.

With regard to the detected movements of the mounting regions, no detailed information has been provided.

An advantageous solution provides that the movements of the mounting regions comprise translational and rotational movements of the mounting regions and thus also of the fixation regions relative to one another, said movements being caused by an elastic deflection of the supporting structure portion and taking place in a plane.

This means that by the formation of the sensor base, primarily the translational and rotational movements taking place in one plane are detected, whereas translational and rotational movements taking place transverse to this plane have a lesser effect on the movement of the measuring points or merely result in non-relevant movements of the measuring points.

It is in particular advantageous here if the transformation region of the sensor base can be moved independently of the intermediate region, located between the mounting regions, of the supporting structure portion.

This means that the movement of the intermediate region of the supporting structure portions has no direct effect on the movement of the transformation region, but that the transformation region is only influenced by the relative movements of the mounting regions and thus of the fixation regions of the sensor base, whereas the movements of the intermediate region of the supporting structure portion, although linked to the movements of the mounting regions, have no direct effect on the transformation region, but have an effect only through the movements of the mounting regions.

This solution has the great advantage that thereby the movements of the transformation region transform the relative movements of the mounting regions that are spaced apart from one another into movements of the measuring points and thus transform them to a greater extent than in the case of a direct connection between the transformation region and the intermediate region.

With regard to the formation of the sensor base, no detailed information has been provided heretofore.

For example, the sensor base could have any shape as long as this shape results in an advantageously measurable movement of the measuring points.

A solution that is particularly advantageous on grounds of simplicity provides that the sensor base is formed in a plate-shaped manner and extends in a sensor base surface.

Thus, the fixation regions as well as the transformation region located between the fixation regions extend in the sensor base surface.

In this case it is preferably provided that the transformation region of the sensor base converts movements of the fixation regions about pivot axes running transversely or perpendicular to the sensor base surface into movements of the measuring points of the transformation region relative to one another; this means that such rotational movements or pivoting movements, which lie in the sensor base surface, result in movements of the measuring points relative to one another.

In particular, it is preferably provided that due to the elastic deformations, the mounting regions of the supporting structure portion perform movements which take place in a surface parallel to the sensor base surface and which therefore can advantageously be converted by the transformation region into movements of the measuring points relative to one another.

In order to be able to implement the sensor base as a continuous part, it is preferably provided that the fixation regions of the sensor base are connected to one another by at least one elastically movable element, said elastically movable element having no influence on the transformation properties of the transformation region, but merely serving for holding together the fixation regions and also the transformation region so as to form an integral part.

It is preferably provided here that the elastically movable element is part of the transformation region.

With regard to the formation of the transformation region, no detailed information has been provided in connection with the previous explanations for the individual exemplary embodiments.

Thus, an advantageous solution provides that the transformation region has at least one projection which extends from one of the fixation regions toward the other one of the fixation regions and which forms one of the measuring points.

This solution has the advantage that due to the arrangement of the measuring point on said projection, the distance covered by the measuring point during a rotational movement of the fixation region can be increased so that the measuring point, when disposed on the projection, covers a greater distance than in the case in which the measuring point is provided directly on the fixation region.

Particularly advantageous is therefore a solution in which the transformation region has at least one projection which extends from each of the fixation regions toward the respective other one of the fixation regions, and that each of the projections carries at least one of the measuring points.

In this manner, the distances which are covered by the measuring points during rotational movements of the fixation regions can be increased, and the effects to be measured with the sensor unit can thus be detected more clearly.

For example, the projections are disposed in such a manner that they have portions which face one another and with which the measuring points are associated.

It is particularly beneficial if the projections have portions running spaced apart from one another and if the measuring points are associated with these portions.

A particularly great intensification of the effects during a rotational movement of a fixation region can be achieved if one of the projections is formed as an arm and thus has an extent that is large compared to the distance of the fixation regions from one another.

It is in particular provided here that the measuring point is disposed in an arm region that is at a maximum spacing from the fixation region carrying said arm.

It is preferably provided here that a distance between the measuring point and the fixation region corresponds to at least a third of the distance of the fixation regions from one another so that the arm has a very great length.

It is even better if the distance between the measuring point and the fixation region corresponds to at least half of the distance of the fixation regions from one another.

When forming one of the projections as an arm, it is particularly advantageous if the projections have different lengths, that is, if the projections provided on one fixation region have a smaller length than the projections provided on the other fixation region.

For example, the projection formed as an arm has an extent toward the opposing fixation region, which extent corresponds to at least two times, even better at least three times the extent of the projection of the opposing fixation region.

In the extreme case, the arm extends in this case from the one fixation region to the other fixation region, and the at least one measuring point is provided directly on the other fixation region.

With regard to the formation of the sensor unit, no detailed information has been provided heretofore.

Thus, theoretically, the sensor unit could detect a bending or a twist of a sensor element.

An advantageous solution provides that the sensor unit comprises a distance measuring unit.

The distance measuring unit could operate using mechanical contact, that is, for example, could operate using pressure.

However, it is particularly advantageous if the distance measuring unit detects the distance between the measuring points in a mechanically contactless manner.

Preferably, it is provided in this case that at each of the measuring points, the distance measuring unit has one of two interacting measuring elements.

The measuring elements could operate here on the basis of an optical measurement or on the basis of other physical distance-relevant variables.

It is particularly advantageous if the distance measuring unit performs a distance measurement based on magnetic field detection.

For this reason, an advantageous solution provides that the distance measuring unit comprises a magnetic-field-generating measuring element and a magnetic-field-measuring measuring element.

The magnetic-field-generating measuring element can be formed such, for example, that it includes a permanent magnet, or can be formed such that it comprises an electrically operable coil which generates the magnetic field.

In this case, there is advantageously the possibility of operating the electrically operable coil in such a manner that the magnetic field is optimal for the respective measuring process or varies, if necessary, or even oscillates.

With regard to the magnetic-field-measuring measuring elements, likewise, no further information has been provided. Thus, all magnetic-field-measuring measuring elements can be used.

A particularly useful solution provides that the magnetic-field-measuring measuring element comprises a Hall sensor.

With regard to the formation of the sensor base, many different solutions are conceivable.

Theoretically, the sensor base can be made of a material transmitting solely the mechanical movements, for example of metal or plastics, without the sensor base assuming further functions.

A formation of the sensor unit that is advantageous with regard to the manufacture of the solution according to the invention is preferably formed such that the sensor base comprises a printed circuit board for accommodating a sensor circuit.

In principle, the printed circuit board could also assume the mechanical functions; since a printed circuit board in many cases has insufficient stability, the sensor base is expediently formed as a composite component from a carrier plate and a printed circuit board, the carrier plate being responsible for the mechanical properties and the printed circuit board serving for accommodating the sensor circuit and providing the electrical conductors.

It is particularly useful here if the printed circuit board extends up to the measuring points and if on the printed circuit board, the elements of the distance measuring unit are disposed at the measuring points.

In order to determine values for the forces acting on the supporting structure from the movements of the measuring points detected by the sensor unit, preferably an evaluation unit is provided for determining the force from the movements of the measuring points detected by the sensor unit.

For example, an evaluation unit operates in such a manner that for determining the force, it compares force-free sensor signals with force-induced signals.

For example, there is the possibility that the evaluation unit determines a measure for the force from the deviation of the force-induced sensor signals from a force-free sensor signal.

In particular in the case in which the force of a vertical load is to be detected, it is preferably provided that the evaluation unit determines the deviation of a vertical-load-induced sensor signal from a vertical-load-free sensor signal.

For determining the force-free sensor signal, different possibilities are conceivable.

For example, it is conceivable that the evaluation unit determines the force-free sensor signal in the course of a reference value measurement which, for example, can be performed automatically or upon initiation by a user prior to beginning to attach a load.

In order to determine exclusively the static load acting on the supporting structure, it is preferably provided that the evaluation unit determines the load-induced sensor signal, that is, the sensor signal acting on the supporting structure by a static force, when the vehicle is not moving.

In order to further determine to what extent the determined force represents a permissible force which does not affect the vehicle characteristics, or represents a force which significantly affects the vehicle characteristics or handling characteristics, it is preferably provided that the evaluation unit determines the permissibility of the force by comparison with at least one reference value predefined, for example stored, in the evaluation unit.

In order to open the possibility that a user can see the determined force acting on the supporting structure, it is preferably provided that the evaluation unit is coupled to a display unit which displays said force.

For example, such a display unit is provided either on the motor vehicle or directly on the supporting structure, for example, on a ball neck of a trailer hitch.

Alternatively or additionally to measuring a force, in particular a static force, acting on the supporting structure there is also the possibility to use the sensor unit according to the invention for detecting accelerations acting on the supporting structure, namely by determining the temporal variation of the force, for example, during vehicle operation.

At the moment the force acting on the supporting structure changes with respect to the force when the vehicle is stationary with a static load, an acceleration is present which acts on the supporting structure.

Thus, just by detecting the changes of the forces during vehicle operation, accelerations acting on the supporting structure can be detected, the magnitude of the accelerations being directly related to the change of the forces acting on the supporting structure.

Thus, in the case of the support unit according to the invention, all forces can be detected which act on the supporting structure and result in an elastic deformation of the supporting structure portion detected by the sensor unit in the particular plane in which the mounting regions, due to the forces acting, move relative to one another, said plane running parallel to the respective sensor base surface of the corresponding sensor base.

If forces are to be detected which act in different planes, there is the possibility to provide a plurality of sensor units according to the invention with differently aligned sensor base surfaces on the supporting structure, which sensor units then detect the elastic deformations of mounting regions in planes aligned correspondingly to the different sensor base surfaces.

When using a sensor unit for determining the force of a vertical load, there is already the possibility to determine the force of the vertical load not only when the vehicle is stationary, but also to determine additional vertical forces occurring when the vehicle is moving, because these forces act in the same direction as the force of the vertical load.

In connection with the previous description of the individual exemplary embodiments, it has not been discussed which distance the fixation regions of the sensor base have relative to one another.

In order to obtain movements of the measuring points that can be measured as simply as possible it is provided that the fixation regions of the sensor base are disposed at a distance greater than 1 cm from one another.

It is even better if the fixation regions of the sensor base are at a distance of several centimeters from one another.

Further features and advantages of the invention are the subject matter of the following description and the illustration of a plurality of exemplary embodiments.

BRIEF DESCRIPTION OF THE DRAWINGS

FIG. 13 shows an illustration similar to FIG. 5 of a second exemplary embodiment of a sensor unit according to the invention as it is used in the first exemplary embodiment of the support unit according to the invention;

DETAILED DESCRIPTION OF THE INVENTION

Figure 1:
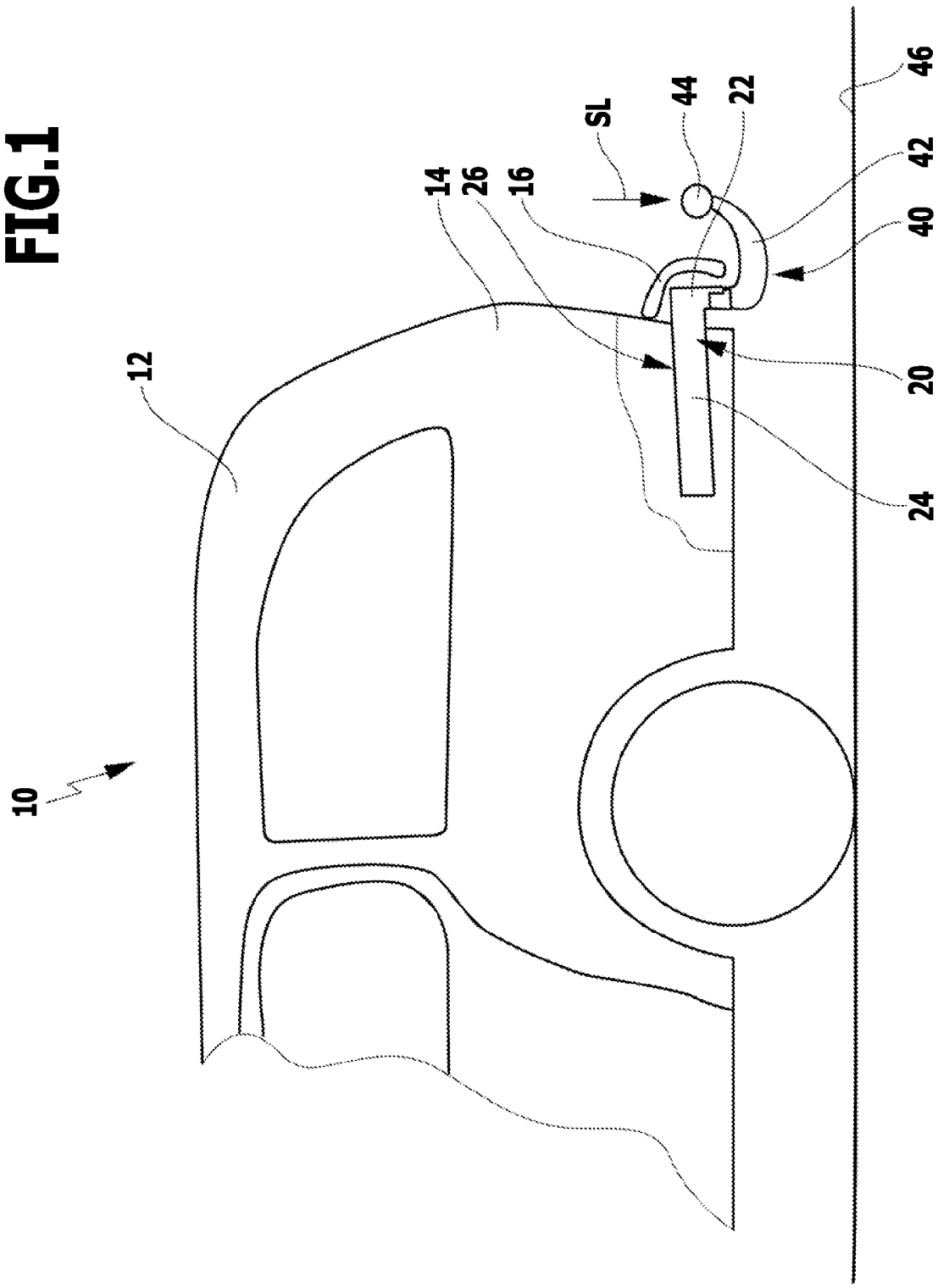
FIG. 1 shows a partially cutaway side view of a vehicle body with a support unit according to the invention.

A motor vehicle which, as a whole, is designated by 10 in FIG. 1 comprises a vehicle body 12, in the rear end region 14 of which a support unit 20 according to the invention is mounted, which said support unit has a crossmember 22 covered by a bumper unit 16 as well as side members 24 which extend in the longitudinal direction of the body along body wall portions and are fixable thereto and which, together with the crossmember, form a body connecting member 26 (FIG. 2) which is partially covered by the vehicle body 12 and partially covered by the bumper unit 16.

Figure 3:
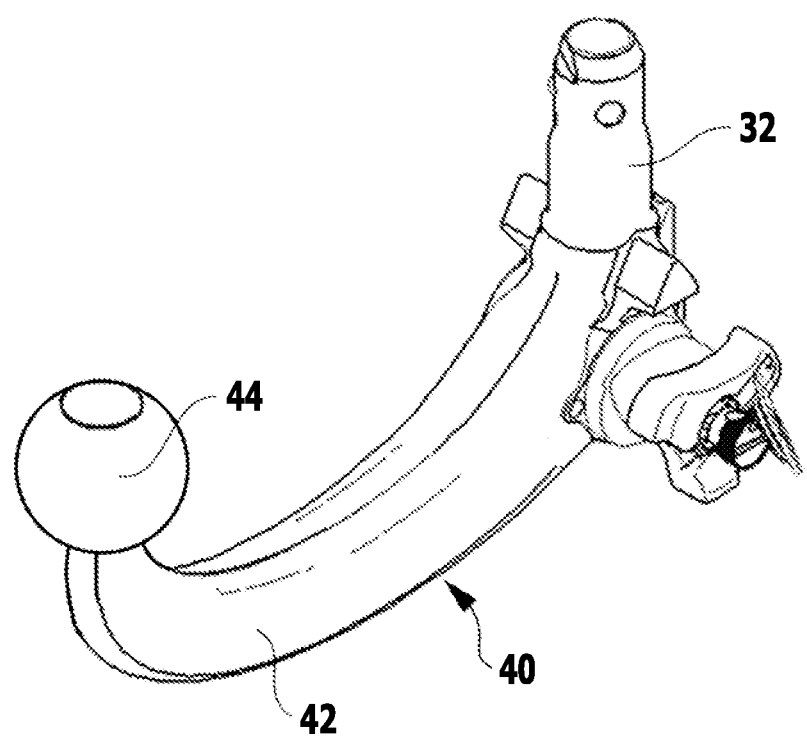
FIG. 3 shows an enlarged perspective illustration of a support element of the first exemplary embodiment of the support unit according to the invention.

Provided on the body connecting member 26 is a receptacle, designated as a whole by 30, for a holding element 32, shown enlarged in FIG. 3, of a support element which, as a whole, is designated by 40 and in this case is formed as a ball neck 42 which carries the holding element 32 at one end and is provided with a coupling ball 44 as a load-bearing element at the other end.

In this exemplary embodiment, the body connecting member 26 and the support element 40 form a supporting structure 60 according to the invention.

In the case of the ball neck 42 as a support element 40, at least the following forces act on the coupling ball 44 which serves for connecting to a vehicle trailer or for receiving a rear load carrier.

In the static case, that is, when the vehicle is stationary, a force SL acts on the coupling ball 44, which said force SL corresponds to a vertical load and is preferably directed in the vertical direction transverse to a roadway 46 and can act on the coupling ball 44 in the direction of gravity or opposite to the direction of gravity.

The force SL which corresponds to the vertical load represents a measure of how strongly a trailer presses onto the coupling ball 44 or how heavy a rear load carrier of the motor vehicle is, the rear load carrier being engaged on the coupling ball 44.

In addition, during driving operation of the motor vehicle, a vertical force Vo lying in the longitudinal center plane FL of the vehicle acts from above and/or a vertical force Vu lying in the longitudinal center plane FL of the vehicle acts from beneath, always depending on the actual dynamic driving conditions to which the motor vehicle 10 and a trailer coupled thereto or a rear load carrier mounted thereon are subjected.

At the same time, a transverse force Ql acts during vehicle operation on the coupling ball 44 substantially horizontally from the left on said coupling ball and/or a transverse force Qr, possibly opposite thereto, acts from the right, said transverse forces Ql and Qr preferably being transverse, in particular perpendicular to the longitudinal center plane FL of the vehicle.

Furthermore, during vehicle operation, a horizontally oriented longitudinal force Lv acts on the coupling ball 44 in the forward direction and/or a horizontally oriented longitudinal force Lr acts in the rearward direction, said longitudinal forces Lv and Lr lying in the longitudinal center plane FL of the vehicle, in the same manner as the vertical force Vo from above and the vertical force Vu from beneath.

The object according to the invention, namely to make driving situations for the motor vehicle 10 safer and, where necessary, to detect unsafe driving conditions, is achieved by the support unit according to the invention in that at least one or a plurality of forces SL, Ql, Qr, Vo, Vu, Lv and Lr are detected by a sensor unit S1 that is comprised by the support unit 20 according to the invention and has an evaluation unit 50, and are evaluated, for example, with the aid of threshold values.

Figure 4:
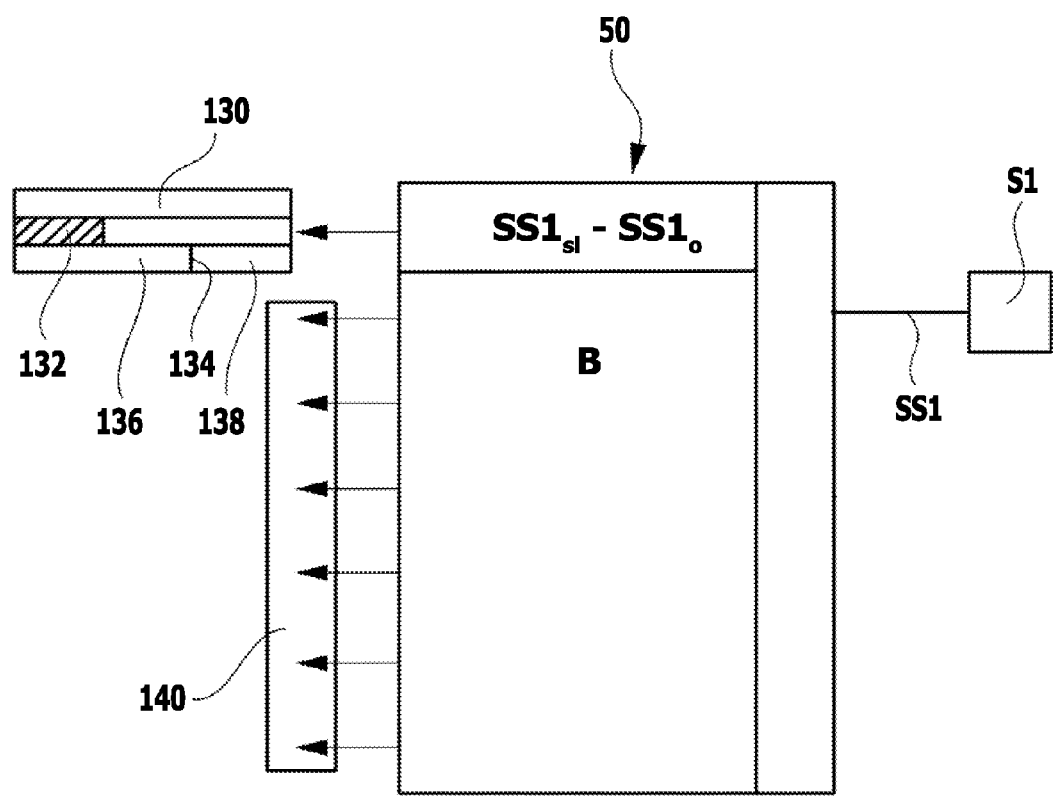
FIG. 4 shows a schematic illustration of an evaluation unit relating to a sensor unit according to the invention and a display unit.

The evaluation unit 50 for its part then determines in the course of the evaluation if information signals for the user of the motor vehicle or for driving situation detection are output (FIG. 4).

Figure 2:
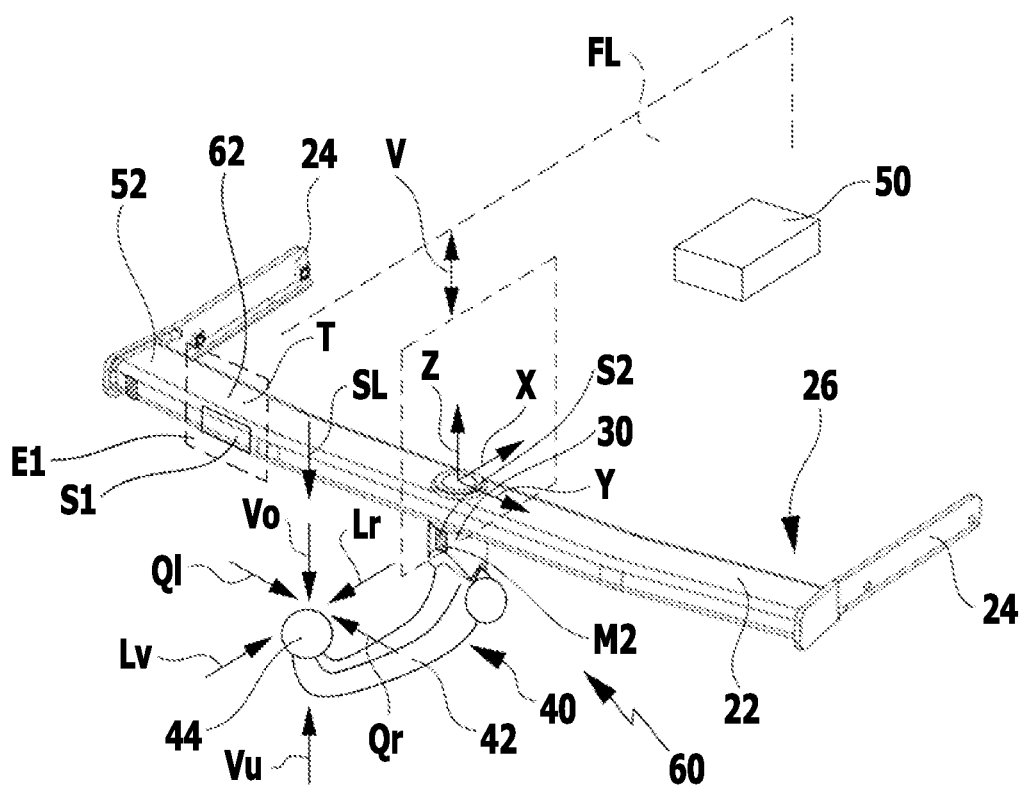
FIG. 2 shows a perspective illustration of a first exemplary embodiment of a support unit according to the invention.

Detecting the aforementioned forces by the evaluation unit 50 is carried out, as illustrated, for example, in FIG. 2, by the sensor unit S1 which is disposed on an elastically deformable supporting structure portion T of the supporting structure 60 and which detects the elastic deformation of the supporting structure portion T caused by the aforementioned forces.

For example, in the exemplary embodiment illustrated in FIG. 2, the sensor unit S1 is disposed on the crossmember 22 and detects, in a plane E1 running parallel to the Z/Y-directions, an elastic deformation of the crossmember portion 62 forming the supporting structure portion T of the crossmember 22.

Figure 5:
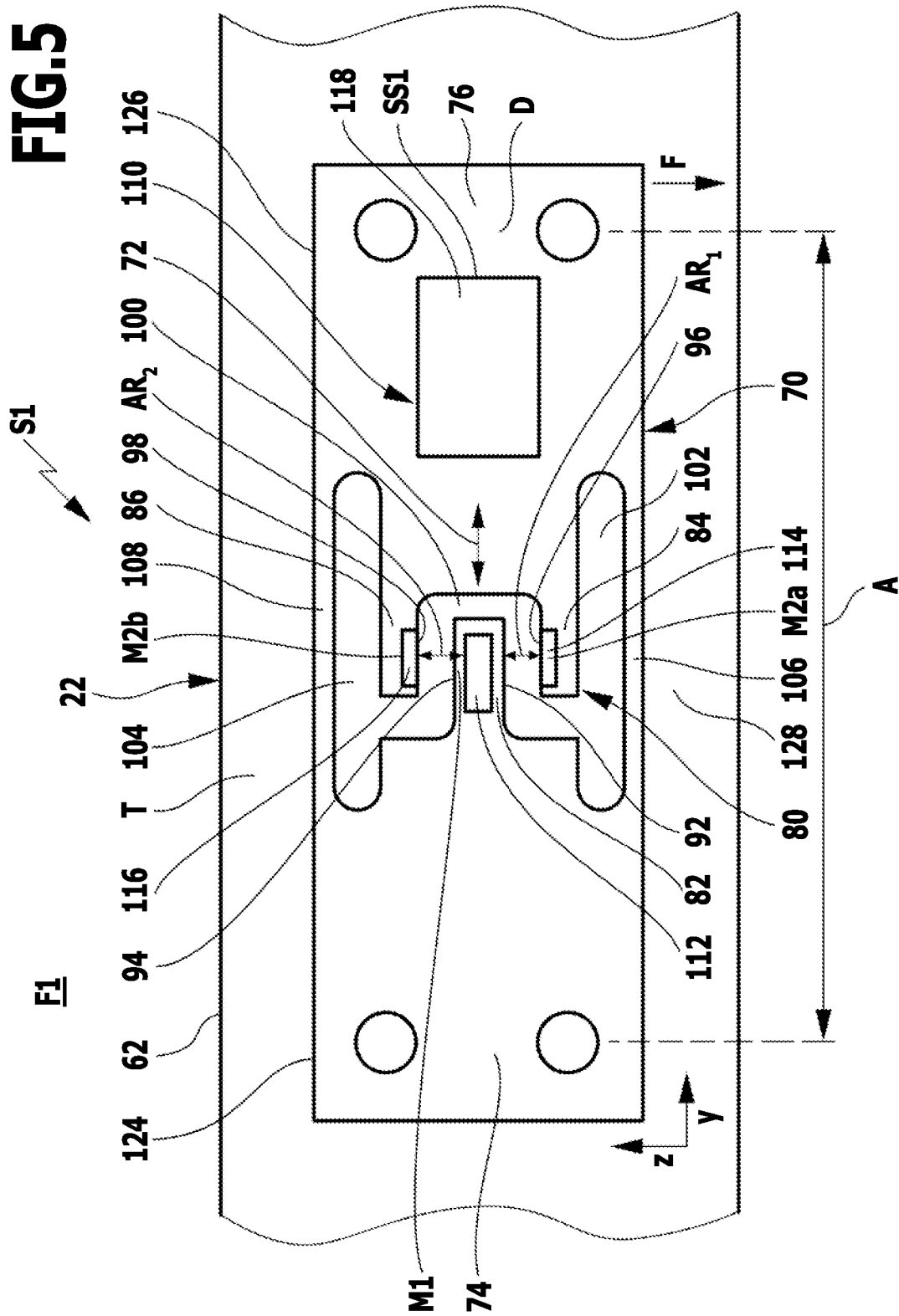
FIG. 5 shows a schematic top view of a first exemplary embodiment of a sensor unit according to the invention as it is used in the first exemplary embodiment of the support unit according to the invention.

A first exemplary embodiment of a sensor unit S1 according to the invention illustrated in FIG. 5, which is disposed on the supporting structure portion T and which is able to detect a deformation, that is, for example, a bending, of the supporting structure portion T in the plane of projection of FIG. 5 which is parallel to the plane E1, comprises a sensor base which, as a whole, is designated by 70 and which, for example, is formed as a plate-shaped part made of metal or plastics, extending parallel to the plane E1 in a sensor base surface F1, which said plate extends in a longitudinal direction 72 and which, in the longitudinal direction 72, has fixation regions 74 and 76 disposed spaced apart from one another at a distance A which lies in the order of several centimeters, between which fixation regions there is a transformation region of the sensor base 70 which, as a whole, is designated by 80. The transformation region 80 is formed by a finger-like projection 82, for example in the form of a tongue, which is fixedly connected to the first fixation region 74 and which, starting from the fixation region 74, extends, for example, parallel to the longitudinal direction 72 or at an acute angle to the longitudinal direction 72 in the direction of the fixation region 76.

Furthermore, the transformation region 80 is formed by two finger-like projections 84 and 86 of the fixation region 76, for example likewise in the form of tongues, which, starting from said fixation region, extend in the direction of the first fixation region 74, namely approximately parallel to the longitudinal direction 72 or at an acute angle thereto.

Preferably, the finger-like projections 84 and 86 extend parallel to one another and, even better, also parallel to the finger-like projection 82.

According to the invention, for example, the finger-like projection 82 lies between the finger-like projections 84 and 86 and extends contact-free therebetween so that the finger-like projection 82 can move relative to the finger-like projections 84 and 86 in a substantially force-free manner.

It is advantageous here if the finger-like projection 82 is disposed substantially approximately centered between the finger-like projections 84 and 86 and has edge regions 92 and 94 which oppose one another and between which a first measuring point M1 is located and which face an edge region 96 of the finger-like projection 84 and an edge region 98 of the finger-like projection 86 which are adjoined by second measuring points M2a and M2b, said edge regions 92 and 96 as well as 94 and 98 opposing one another in the initial state of the sensor base 70 and running at approximately equal distances AR1 and AR2 from one another respectively.

Preferably, the finger-like projections 82 as well as 84 and 86 are formed in that from a plate forming the fixation regions 74 and 76, a generally omega-shaped recess 100 is cut out which encloses the finger-like projection 82 and therefore also creates the free space between the finger-like projection 82 and the finger-like projections 84 and 86 which are formed as a result of this on both sides of the projection 82.

Furthermore, the finger-like projections 84 and 86 are bordered on their sides facing away from the finger-like projection 82 by recesses 102 and 104 which are located between the finger-like projections 84 and 86 and also between the outer spring-elastic webs 106 and 108 which, for example, are formed by outer edges of the plate-shaped part forming the sensor base 70 and connect the fixation regions to one another so that the sensor base 70 is preferably formed as a continuous part.

The sensor base 70 represents a mechanical part which carries distance measuring elements of a measuring unit which, as a whole, is designated by 110, a first measuring element 112 being located on the finger-like projection 82 between the edge regions 92 and 94 at the measuring point M1, and being, for example, a magnetic-field-generating element, which can be formed as a permanent magnet or as an energizable coil.

Moreover, second measuring elements 114 and 116 which, for example, are formed as magnetic field sensors, in particular as Hall detectors, and detect the magnetic field of the magnetic-field-generating first measuring element 112, are located close to the edge regions 96 and 98 at the second measuring points M2a and M2b of the finger-like projections 84 and 86.

Since the magnetic field which is detected by the second measuring elements 114 and 116 varies with the distance from the first measuring element 112, the second measuring elements 114 and 116 thus serve for detecting the distance from the in each case first measuring element 112, said distances varying in the same manner as the distances AR1 and AR2 of the edge regions 92 and 96, and 94 and 98, respectively.

The measuring elements 112, 114 and 116 are electrically connected to a sensor circuit 118 so that the sensor circuit 118 is able to detect a distance between the measuring points M1 as well as M2a and M2b, respectively, of the finger-like projections 82 and 84 as well as 82 and 86, and to generate a sensor signal SS1 that indicates the distance or a variation of the distance with regard to an initial position.

In the illustrated exemplary embodiment, the sensor base 70 thus serves not only for mechanically transmitting the movement of the fixation regions 74 and 76 to the measuring points M1, M2a and M2b and to the measuring elements 112 as well as 114 and 116 carried by the latter, but also as a carrier of the sensor circuit 118.

In the first exemplary embodiment of the sensor unit S1, the fixation regions 74 and 76 are now firmly connected to mounting regions 124 and 126, which carry said fixation regions, of the supporting structure portion T, that is, in this case of the crossmember portion 62, wherein an intermediate region 128 of the supporting structure portion T, in this case of the crossmember portion 62, has no connection to the sensor base 70 and the movements of the same therefore have no effect on the sensor base 70, in particular no effect on the transformation region 80, so that the transformation region 80 moves only according to the movements of the fixation regions 74 and 76.

A force SL acting on the coupling ball 44 now leads to the situation that the force SL of the vertical load acts as a force in the region of the receptacle 30 on the crossmember 22 and is transmitted onto the entire crossmember 22 and causes also a deflection of the crossmember portion 62 comprising the mounting regions 124 and 126 as well as the intermediate region 128 therebetween so that a force F acts on the mounting region 126, wherein for evaluating the elastic deformation of the crossmember portion 62, the mounting region 124 is considered as a fixing point, extending from which the crossmember portion 62 deflects under the action of the force F in the direction of the force F so that due to the deflection, the mounting region 126 migrates slightly in the direction of the force F and performs a pivoting movement about a pivot axis D at the same time.

The migrating of the mounting portion 126 relative to the mounting portion 124 as well as the pivoting of the mounting portion 126 takes place by fractions of a millimeter, also depending on how far the fixation regions 74 and 76 and therefore also how far the mounting portions 124 and 126 are apart from one another.

Since the fixation regions 74 and 76 follow the movements of the mounting regions 124 and 126 relative to one another and the intermediate region 128 has no influence on the sensor base 70 and thus also no influence on the movements of the transformation region 80 of the sensor base 70, the movement of the fixation region 76 relative to the region 74 results in a movement of the finger-like projections 82 and 84 as well as 82 and 86 of the transformation region 80 relative to one another, said distances AR1 and AR2 changing relative to one another, which means that one of the distances AR1 or AR2 increases and the other one of the distances AR2 or AR1 decreases.

This change of the distances AR1 and AR2 caused by the transformation region 80 of the sensor base 70 is detected by the measuring elements 112 as well as 114 and 116, and the sensor circuit 118 of the measuring unit 110 generates the sensor signal SS1 which indicates a measure for the elastic deflection of the crossmember portion 62.

Thus, with the evaluation unit 50 there is the possibility, without loading the coupling ball 44, to store a reference value, for example, the sensor signal $SS1_0$ and then to set the subsequently measured sensor signals $SS1_{SL}$ occurring at one or a plurality of vertical loads in relation to the reference value $SS1_0$ and to derive therefrom a measure for the force SL exerted by the vertical load.

For example, associated with the evaluation unit 50 is a display unit 130 (FIG. 4) which displays in the form of a bar 132 the value for the force SL corresponding to the vertical load, said bar 132 running parallel to a scale field 134 which differentiates for an observer between a tolerable range 136 and a non-tolerable range 138 and thus gives the user of the support unit 20 according to the invention the possibility to determine if the force SL caused by the vertical load and acting on the support unit 20 is within a tolerable or non-tolerable range.

However, there is also the possibility to additionally mark the scale field 134 with differently graded ranges of tolerability and thus to give the user the possibility to differentiate between a plurality of ranges of tolerability.

There is even the possibility to form the scale field 134 such that it displays values of the force SL caused by the vertical load.

Preferably, the display unit 130 is provided either on the motor vehicle or on the support unit 20; for example, in the case of the ball neck 42, it is provided directly on the ball neck 42.

With the sensor unit S1 according to the invention there is also the possibility to detect dynamic loads during vehicle operation by analyzing the temporal variation of the sensor signals $SS1_{SL}$ and thus, for example, to detect accelerations which act on the support unit 20 according to the invention insofar as they have an effect on the movements of the crossmember portion 62 in the plane E1, and to transmit these accelerations to a unit 140 for detecting the dynamic loading of the support unit 20.

For example, it is conceivable to interpret the sensor signal SS1, when the vehicle is stationary, as the force caused by the vertical load, and when the vehicle is moving, based on the force of the vertical load determined when the vehicle was stationary, to evaluate the additional forces V, Q and L as a dynamic load, which said forces, in addition, occur in a temporally varying manner and which, depending on how they interact, can result in a deformation of the crossmember portion 62 with a movement in the plane E1.

Figure 6:
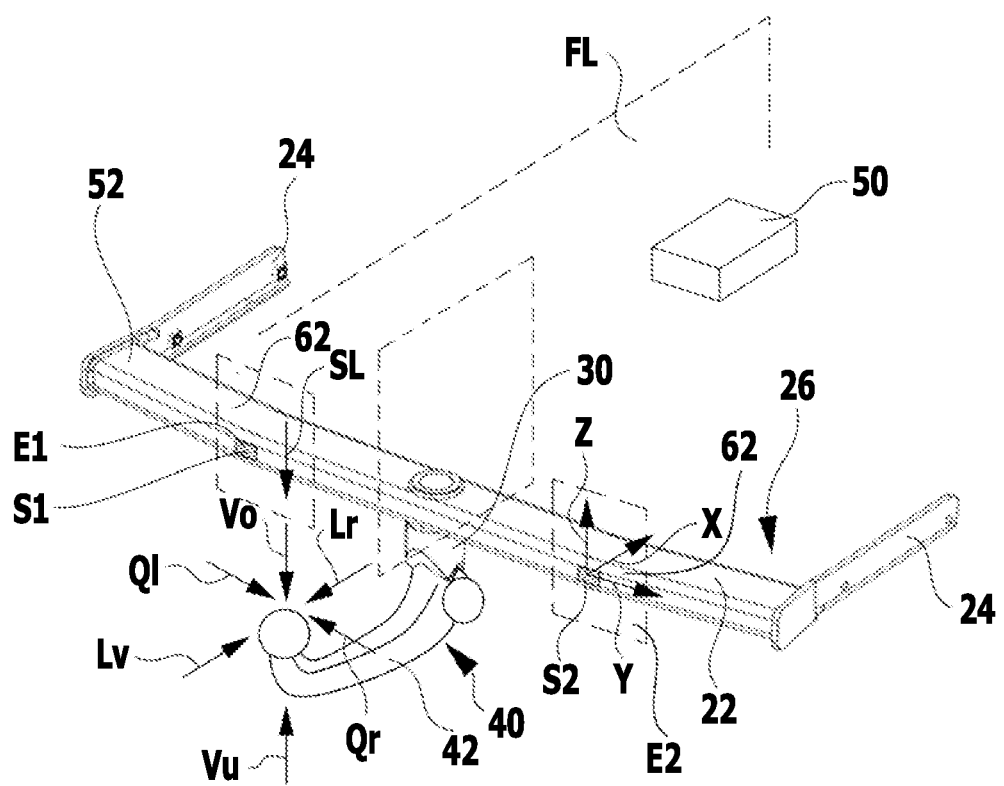
FIG. 6 shows a perspective illustration similar to FIG. 2 of a second exemplary embodiment of a support unit according to the invention.

The accuracy of the measuring unit can be further improved in that sensor units S1 and S2, as illustrated in FIG. 6 by means of a second exemplary embodiment of the support unit 20 according to the invention, are provided on two crossmember portions 62, which said senor units are both formed as described in connection with the sensor unit S1, but detect the deformation of the crossmember 22 at different places on the same.

In the illustrated second exemplary embodiment of the support unit 20 according to the invention, the sensor units S1 and S2 are disposed such that they lie in planes E1 and E2 which run parallel to one another and thus detect deformations which are determined by substantially the same forces acting on the coupling ball.

Figure 7:
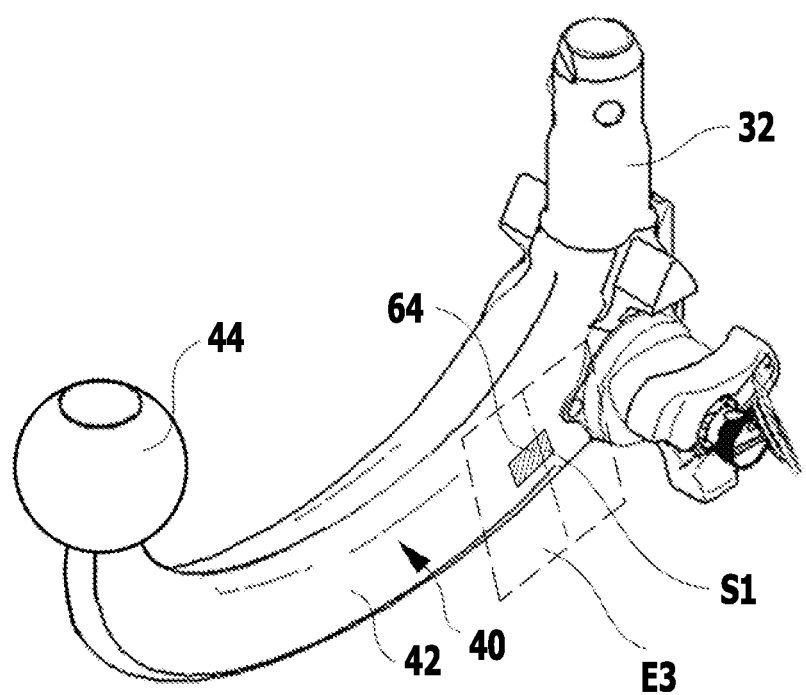
FIG. 7 shows an enlarged illustration of the support element similar to FIG. 3 of a third exemplary embodiment of a support unit according to the invention.

Alternatively or additionally to the first and second exemplary embodiments, it is provided in a third exemplary embodiment of the support unit 20 according to the invention, of which only the support element 40 is illustrated in FIG. 7, that the sensor unit S1 is disposed directly on the ball neck 42, with it being possible, for example, for the sensor unit S1 to be disposed close to the holding element 32 or close to the coupling ball 44 so as to detect elastic deformations of a ball neck portion representing the supporting structure portion on the ball neck 42.

In this exemplary embodiment, the plane E3, in which the sensor unit S1 is disposed, runs parallel to the X- and Z-directions, the sensor unit S1 also detecting deformations of the ball neck 42 which can be induced by the force SL of the vertical load or by the forces V or in some cases by the forces L.
The evaluation of the sensor signals SS1 is performed in the same manner as described in connection with the preceding exemplary embodiments.

Apart from that, all parts not explicitly mentioned in connection with the third exemplary embodiment are formed in the same manner as the corresponding parts of the first exemplary embodiment so that with regard to the first exemplary embodiment, the explanations thereto can be referenced in full.

Figure 8:
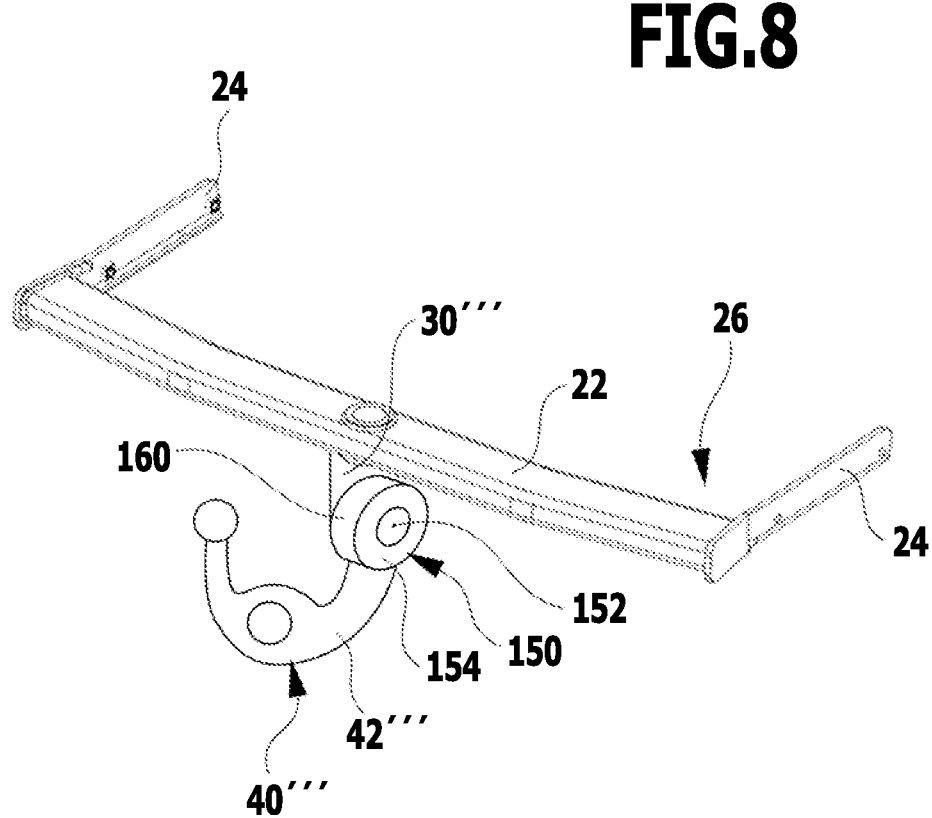
FIG. 8 shows a perspective illustration similar to FIG. 2 of a fourth exemplary embodiment of a support unit according to the invention.
Figure 9:
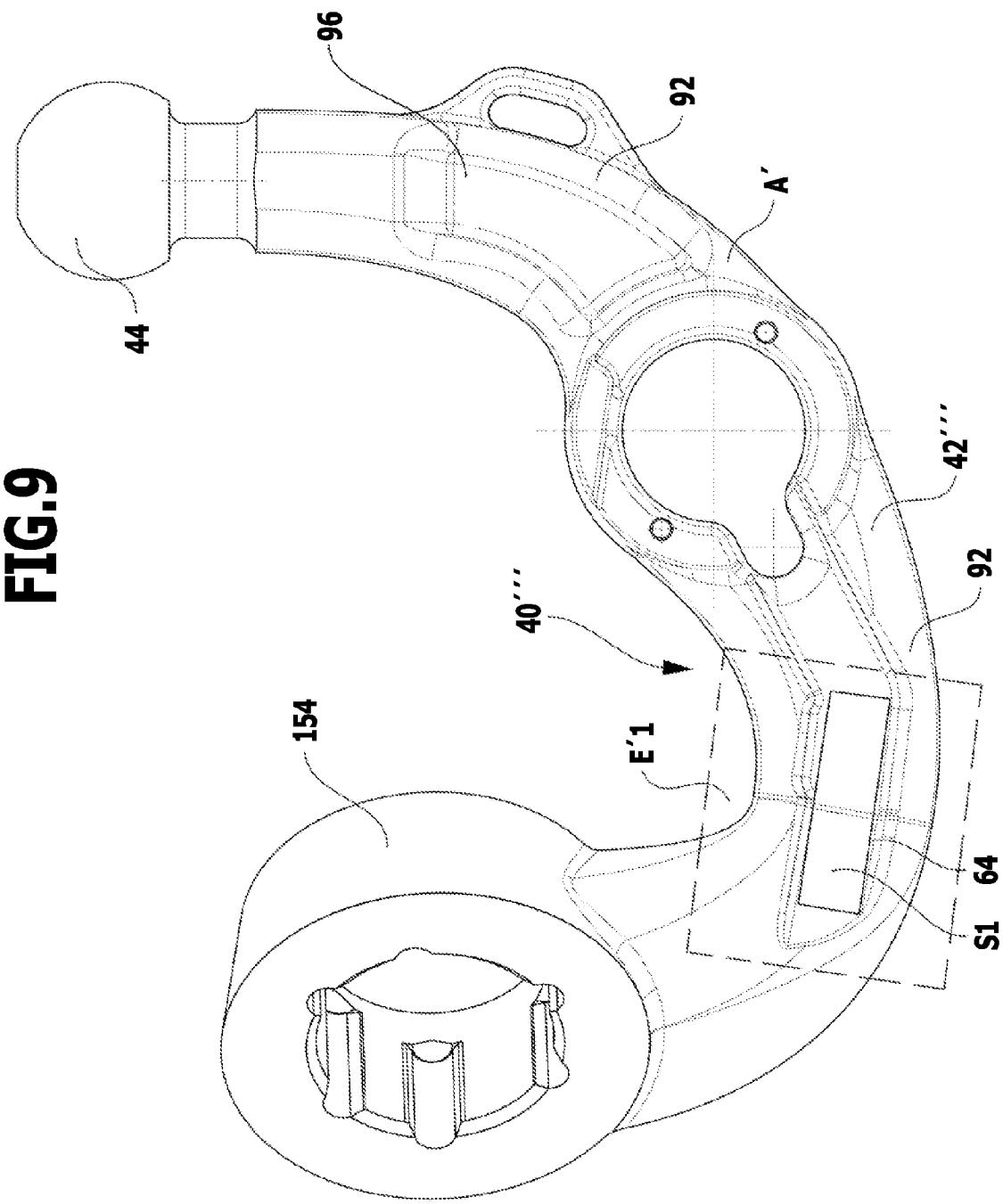
FIG. 9 shows an enlarged illustration of a support element of the fourth exemplary embodiment of the support unit according to the invention.

In a fourth exemplary embodiment, illustrated in FIGS. 8 and 9, the body connecting member 26, except for the receptacle 30''', is formed in the same manner as in the first, second and third exemplary embodiments and is also fixed in the same manner at the rear end region 14 of the vehicle body of the motor vehicle 10.

In contrast to the first exemplary embodiment, the receptacle 30''' comprises a swivel bearing 150 for the support element 40''', the swivel bearing 150 having a bearing body 152 fixed to the vehicle, relative to which bearing body a swivelable bearing body 154 can swivel, which is formed to be swivelable about a single swivel axis as described, for example, in the patent applications EP 0 799 732 A and EP 1 142 732 A, or can be swiveled about multiple axes; in the extreme case, about three axes.

Furthermore, the swivel bearing 150 can be locked in at least one swivel position by a locking device 160 which is not illustrated in detail and which is preferably integrated into the swivel bearing, for example, to rigidly fix the support element 40''' in the operating position illustrated in FIG. 8 relative to the body connecting member 26 in a defined position.

In this fourth exemplary embodiment, the sensor units S1 and S2 can be disposed, for example, on the crossmember 22 as described in connection with the first or second exemplary embodiment.

Additionally or alternatively, it is provided in the fourth exemplary embodiment that the sensor unit S1, as illustrated in FIG. 9, is disposed on the support element 40''', namely in a similar manner as described in connection with the third exemplary embodiment.

In the fourth embodiment too, generating and evaluating the sensor signal SS1 of the sensor unit S1 is carried out in the same manner as described in connection with the third exemplary embodiment.

Figure 10:
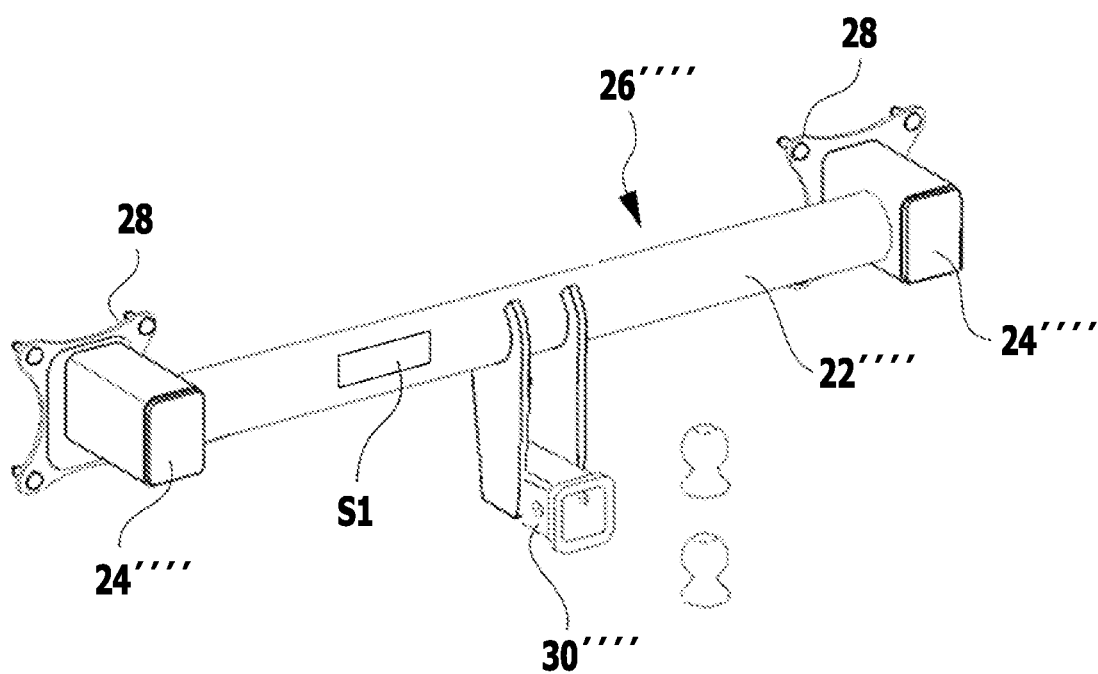
FIG. 10 shows a perspective illustration similar to FIG. 2 of a fifth exemplary embodiment of a support unit according to the invention.

In a fifth exemplary embodiment of a support unit 20 according to the invention, illustrated in FIGS. 10 and 11, the body connecting member 26'''' comprises the crossmember 22'''', the elastic deformation of which can be detected by a sensor unit S1 in the same manner as described in connection with the first exemplary embodiment.

Figure 11:
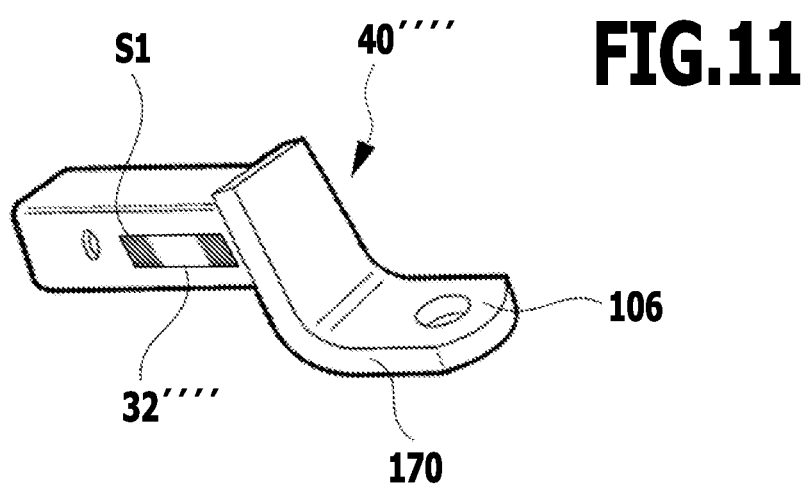
FIG. 11 shows a perspective illustration of a support element of the fifth exemplary embodiment of the support unit according to the invention.

However, in contrast to the first exemplary embodiment, the receptacle 30'''' in the fifth exemplary embodiment is formed as a receptacle sleeve having a square receptacle in which a holding element 32'''', illustrated in FIG. 11, that is formed, for example, as a square pipe, can be inserted and fixed, said holding element 32'''' being part of a support element which, as a whole, is designated by 40'''' and which has a load-bearing element 170 on which either a coupling ball, or, as another element, a load-bearing element of a load carrying device can be mounted.

The force SL of the vertical load acting on the load-bearing element 170 results in the already described manner in deformations of the crossmember 22'''', which said deformations can be detected by the sensor unit S1.

However, it is also possible to provide the sensor unit S1 on the holding element 32'''', for example, and to detect the deformation thereof in a manner analogous to the elastic deformations of the support element 40 in the third exemplary embodiment, as illustrated in FIG. 11.

Apart from that, the fifth exemplary embodiment functions in the same manner as the preceding exemplary embodiments, in particular with regard to the detection of the elastic deformation by the sensor unit S1, so that in this regard, the preceding exemplary embodiments can be referenced in full.

Figure 12:
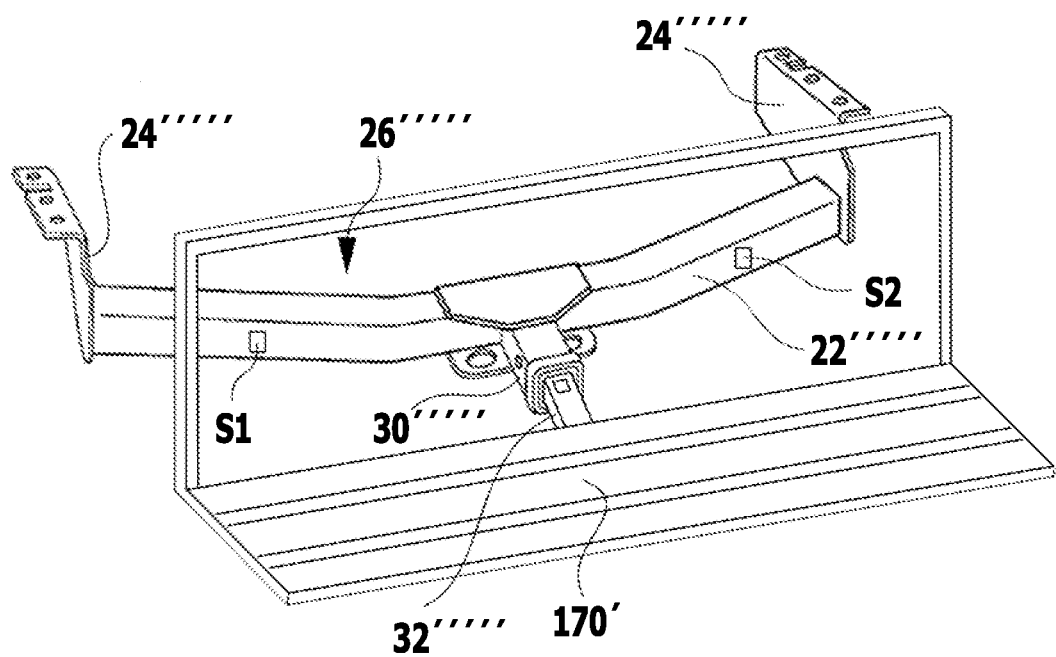
FIG. 12 shows a perspective illustration of a sixth exemplary embodiment of a support unit according to the invention.

In a sixth exemplary embodiment of a support unit 20 according to the invention, illustrated in FIG. 12, the sensor unit S1 or, optionally, an additional sensor unit S2, illustrated in the same manner as in the first or second exemplary embodiment, is disposed on the body connecting 26''''', while the load-bearing element 170', for example, is a bicycle carrier which can be inserted by means of the holding element 32''''' into the receptacle 30'''''.

In a second exemplary embodiment of a sensor unit S1', illustrated in FIG. 13, the same parts are indicated with the same reference numbers so that also with regard to the description, the explanations of the first exemplary embodiment are referenced in full. In particular, the description for the case of the arrangement of the second exemplary embodiment of the sensor unit S1' is carried out in the same manner as the arrangement of the sensor unit S1 in the first exemplary embodiment of the support unit according to the invention.

In contrast to the first exemplary embodiment, the sensor base 70' is insofar changed as the finger-like projections 84' and 86' are disposed at a small distance from the fixation region 76', whereas the finger-like projection 82' has a length which is a multiple of the length of the finger-like projections 84' and 86', preferably has at least two times or three times the length thereof. In particular, the arm 82' is longer than a third of the distance A between the fixation regions 74' and 76'.

Furthermore, the spring-elastic webs 106' and 108' following the finger-like projections 84' and 86' run approximately parallel to the arm 82'. Due to this changed configuration of the transformation region 80 and solely due to the mechanical formation, an increased displacement of the first measuring point that has the first measuring element 112 and is held on the arm 82', takes place relative to the second measuring points M2a and M2b that have the measuring elements 114 and 116, and therefore, due solely to this mechanical formation, a greater change of the distances AR1 and AR2 takes place during a deformation of the supporting structure portion 62 due to the action of the force F.

The evaluation of the signals coming from the distance measuring unit 110 by way of the sensor circuit 118 for generating the sensor signal SS1 is carried out in the same manner as described in connection with the first exemplary embodiment of the sensor unit S1 according to the invention.

Figure 15:
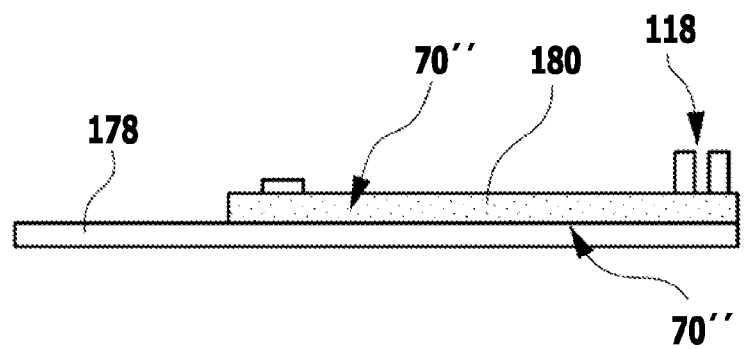
FIG. 15 shows a section along the line 15-15 in FIG. 14.
Figure 14:
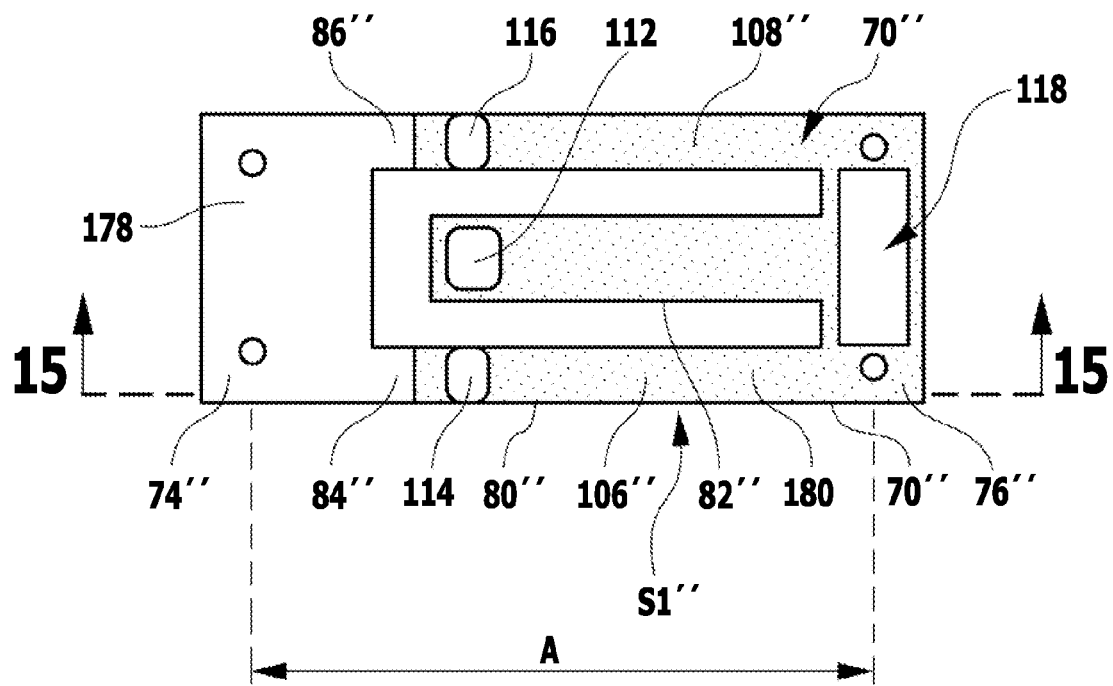
FIG. 14 shows an illustration similar to FIG. 5 of a third exemplary embodiment of a support unit according to the invention.

In a third exemplary embodiment of a sensor unit according to the invention, illustrated in FIGS. 14 and 15, the finger-like projections 84" and 86", in contrast to the first and second exemplary embodiments, are disposed on the fixation region 74" and extend toward the fixation region 76", and the finger-like projection 82", which is situated between the finger-like projections 84" and 86", is provided on the fixation region 76", in the same manner as described for the first and second exemplary embodiments.

Furthermore, the regions extending from the finger-like projections 84" and 86" of the sensor base 70" form the spring-elastic webs 106" and 108" which, similar to the second exemplary embodiment, extend approximately parallel to the finger-like projection 82" which, however, in this exemplary embodiment, is also formed in the form of an arm and has a length which is multiple times, at least two times or three times the length of the projections 84" and 86", or is greater than a third of the distance A between the fixation regions 74" and 76".

In contrast to the first and the second exemplary embodiments, the sensor base 70" is formed as a composite structure of a metal plate 178, for example made of aluminum, with a printed circuit board 180 which is disposed on said metal plate but does not affect the mechanical properties, in particular the elastic deformation, of the metal plate 178, and which extends starting from the fixation region 76" over the finger-like projection 82" formed as an arm up to the first measuring element 112, and extends over the spring-elastic webs 106" and 108" in each case up to the respective second measuring element 114 and 116, respectively. The first measuring element 112 as well as the second measuring elements 114 and 116 are located on the printed circuit board 180 and thus can be fixed in a simple manner on this printed circuit board 180 and can be contacted through this printed circuited board 180, and can in particular be connected in a simple manner to the sensor circuit 118 which is also located on the printed circuit board 180.

Due to this composite structure between the metal plate 178 and the printed circuit board 180, which said composite structure forms the sensor base 70, the sensor unit S1" according to the third exemplary embodiment can be produced in a simple manner and, accordingly, can also be implemented in a cost-effective manner.

Figure 17:
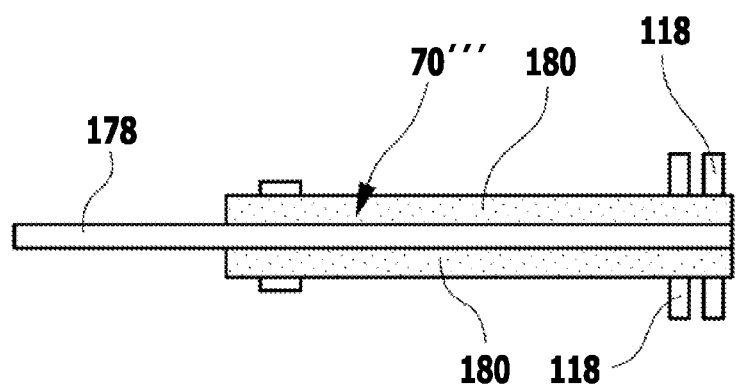
FIG. 17 shows a section along the line 17-17 in FIG. 16.
Figure 16:
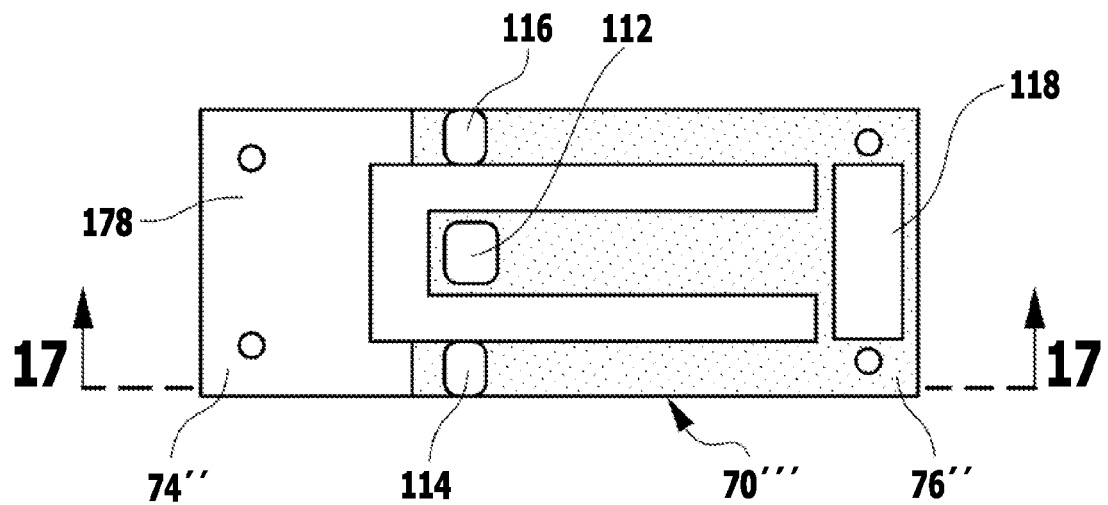
FIG. 16 shows an illustration similar to FIG. 5 of a fourth exemplary embodiment of a sensor unit according to the invention.

In a fourth exemplary embodiment of a sensor unit according to the invention, illustrated in the FIGS. 16 and 17, the sensor base 70''' is formed in a similar manner as in the third exemplary embodiment.

However, in contrast to the third exemplary embodiment, the sensor base 70''' is formed by a composite structure of a metal plate 178 with printed circuit boards 180 disposed on both sides so that on an upper side of the metal plate 178 as well as on a lower side of the metal plate 178, a first measuring element 112 and second measuring elements 114 and 116 are provided which, in the same manner as described for the third exemplary embodiment, can be connected to the sensor circuit 118 by means of the printed circuit board 180.

The invention claimed is:

1. A support unit for motor vehicles, comprising
a supporting structure mountable on a rear end region of the motor vehicle,
a sensor unit for detecting forces acting on the supporting structure and elastically deforming the same, the sensor unit being provided with a sensor base, the sensor base comprising two fixation regions which are spaced apart from one another and can be fixed to mounting regions of an elastically deformable supporting structure portion, and comprises a transformation region disposed between the fixation regions,
the transformation region mechanically converting the movements of the mounting regions and thus also of the fixation regions relative to one another, said movements being generated by the elastic deformation of the supporting structure portion, into a movement of measuring points of the transformation region relative to one another, and the movement of the measuring points being detectable by the sensor unit; and
wherein the sensor unit comprises a distance measuring unit.

2. The support unit according to claim 1, wherein the movements of the mounting regions comprise translational and rotational movements of the mounting regions and thus also of the fixation regions relative to one another, said movements being caused by an elastic deformation of the supporting structure portion and taking place in a plane.

3. The support unit according to claim 1, wherein the transformation region of the sensor base can be moved independently of an intermediate region, located between the mounting regions, of the supporting structure portion.

4. The support unit according to claim 1, wherein the sensor base is formed in a plate-shaped manner and extends in a sensor base surface.

5. The support unit according to claim 1, wherein the transformation region of the sensor base converts movements of the fixation regions about pivot axes running transversely or perpendicular to the sensor base surface into movements of the measuring points of the transformation region relative to one another.

6. The support unit according to claim 1, wherein due to the elastic deformations, the mounting regions of the supporting structure portion perform movements which take place in a surface parallel to the sensor base surface.

7. The support unit according to claim 1, wherein the fixation regions of the sensor base are connected to one another by at least one elastically moveable element.

8. The support unit according to claim 7, wherein that the elastically movable element is part of the transformation region.

9. The support unit according to claim 1, wherein the transformation region has at least one projection which extends from one of the fixation regions toward the other one of fixation regions and which comprises one of the measuring points.

10. The support unit according to claim 9, wherein the transformation region has at least one projection which extends from each of the fixation regions toward the respective other one of the fixation regions, and that each of the projections carries at least one of the measuring points.

11. The support unit according to claim 10, wherein the projections have portions which face one another and with which the measuring points are associated.

12. The support unit according to claim 10, wherein the projections have portions running spaced apart from one another and that the measuring points are associated with these portions.

13. The support unit according to claim 9, wherein one of the projections is formed as an arm.

14. The support unit according to claim 13, wherein the measuring point is disposed in an arm region that is at a maximum spacing from the fixation region carrying said arm.

15. The support unit according to claim 13, wherein a distance between the measuring point and the fixation region corresponds to at least a third of the distance of the fixation regions from one another.

16. The support unit according to claim 1, wherein the distance measuring unit detects the distance between the measuring points in a mechanically contactless manner.

17. The support unit according to claim 1, wherein at each of the measuring points, the distance measuring unit has one of two interacting measuring elements.

18. The support unit according to claim 17, wherein the distance measuring unit performs a distance measurement based on magnetic field detection.

19. The support unit according to claim 18, wherein the distance measuring unit comprises a magnetic-field-generating measuring element and a magnetic-field-measuring measuring element.

20. The support unit according to claim 19, wherein the magnetic-field-generating measuring element comprises a permanent magnet or an electrically operable coil.

21. The support unit according to claim 19, wherein the magnetic-field-measuring measuring element comprises a Hall sensor.

22. The support unit according to claim 1, wherein the sensor base comprises a printed circuit board for accommodating a sensor circuit of the sensor unit.

23. The support unit according to claim 22, wherein the sensor base is formed as a composite component from a carrier plate and a printed circuit board.

24. The support unit according to claim 21, wherein a printed circuit board extends up to the measuring points and that on the printed circuit board, the elements of the distance measuring unit are disposed at the measuring points.

25. The support unit according to claim 1, wherein an evaluation unit is provided for determining the force from the movements of the measuring points detected by the sensor unit.

26. The support unit according to claim 25, wherein for determining the force, the evaluation unit compares force-free sensor signals with force-induced sensor signals.

27. The support unit according to claim 26, wherein the evaluation unit determines a measure for the force from the deviation of the force-induced sensor signals from a force-free sensor signal.

28. The support unit according to claim 25, wherein the evaluation unit determines the permissibility of the force by comparison with at least one reference value predefined in the evaluation unit.

29. The support unit according to claim 25, wherein the evaluation unit is coupled to a display unit which displays the force.

* * * * *